United States Patent [19]

Purser

[11] Patent Number: 5,118,936
[45] Date of Patent: Jun. 2, 1992

[54] ACCURACY OF AMS ISOTOPIC RATIO MEASUREMENTS

[75] Inventor: Kenneth H. Purser, Lexington, Mass.

[73] Assignee: High Voltage Engineeering Europa B.V., Amersfoort, Netherlands

[21] Appl. No.: 696,096

[22] Filed: May 6, 1991

[51] Int. Cl.⁵ .................... H01J 49/28; B01D 59/48
[52] U.S. Cl. .................................... 250/281; 250/282
[58] Field of Search .................... 250/281, 282, 283

[56]  References Cited
U.S. PATENT DOCUMENTS

| 4,031,397 | 6/1977 | Cardillo | 250/281 |
| 4,037,100 | 7/1977 | Purser | 250/281 |
| 4,214,158 | 7/1980 | Schmidt | 250/281 |
| 4,258,257 | 3/1981 | Brackmann | 250/281 |
| 4,568,831 | 2/1986 | Adams | 250/281 |
| 4,973,841 | 11/1990 | Purser | 250/281 |
| 5,013,923 | 5/1991 | Litherland et al. | 250/396 R |

Primary Examiner—Jack I. Berman
Assistant Examiner—Kiet T. Nguyen
Attorney, Agent, or Firm—Nields & Lemack

[57] ABSTRACT

The accuracy of AMS isotopic ratio measurements is improved by a rotating slotted disk which is positioned near the focal plane of a mass recombinator which assists in injecting ions into a tandem accelerator.

2 Claims, 4 Drawing Sheets

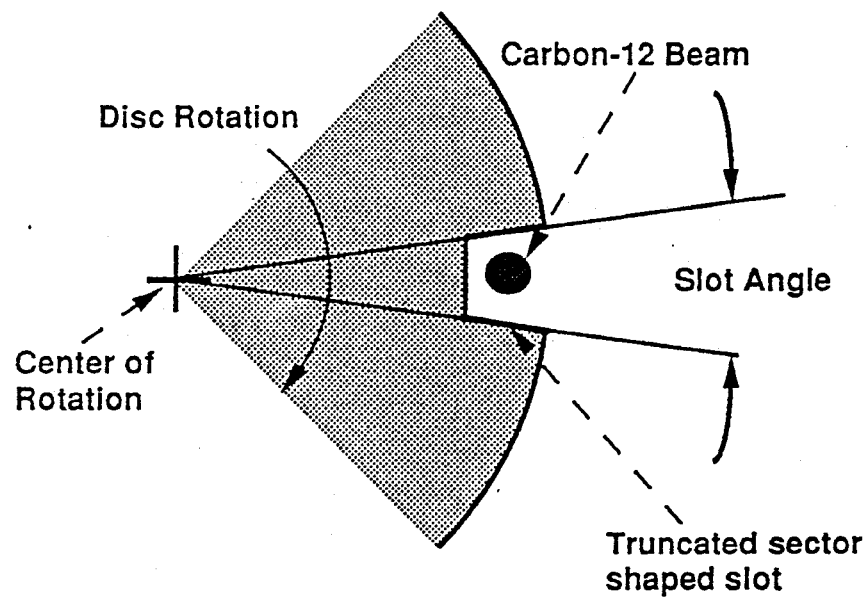
Figure 4: Slot Detail

ACCURACY OF AMS ISOTOPIC RATIO MEASUREMENTS

BACKGROUND OF THE INVENTION

1. Field of the Invention

This invention relates to accelerator mass spectrometry (AMS), wherein negative ions are formed from a sample to be analyzed and are accelerated in a tandem accelerator to a high-voltage terminal maintained at a high positive potential. A stripper within the high-voltage terminal converts the negative ions to a positive charge state and induces dissociation of all background molecules. After further acceleration and mass analysis, the particles to be analyzed are detected and their properties measured.

2. Description of the Prior Art

During the past twelve years, detection efficiency for long-lived isotopes has been dramatically improved by applying the techniques of Accelerator Mass Spectrometry (AMS). Using AMS, the presence of a radioactive nucleus is detected, not by waiting for it to make a radioactive transformation, but rather by searching for the unstable atoms themselves. The basic principles of AMS instrumentation have been described by Kenneth H. Purser in U.S. Pat. No. 4,037,100 and by Kenneth H. Purser, R. B. Liebert and C. J. Russo in Radiocarbon 22, (1980) 794.

Measurements of $^{14}C$ are good examples of the improvements that are possible using AMS. As a specific example, in a milligram sample of modern carbon (from recent wood or animal products) there are approximately $5.10^7$ $^{14}C$ nuclei. The $^{14}C$ nuclei from this milligram disintegrate at a rate of approximately 0.8 disintegrations per hour. In contrast, if using the same sample, AMS procedures were used to count individual $^{14}C$ nuclei, it is possible to detect reliably more than 2% of the total $^{14}C$ nuclei present and at a rate greater than 150 events/second. Only a few minutes are needed to measure $^{14}C/^{12}C$ ratios with a precision better than 1%.

A diagram showing the elements of a typical tandem AMS system is shown in FIG. 1. It can be seen that the instrument includes (1) An ion source from which $C^-$ beams can be generated. (2) A tandem accelerator where all the injected ions are simultaneously accelerated to an energy between 2.0 and 2.5MeV. (3) A gas cell or foil stripper which converts the negative ions to a positive charge state and induces dissociation of all background molecules. (4) A second acceleration stage. (5) A post acceleration mass analysis section where a combination of electric and magnetic deflections eliminates unwanted particles. (6) An ionization detector which independently checks the identity of each arriving particle by measurements of kinetic energy and the rate of energy loss.

Accelerator Mass Spectrometry (AMS) measurements of carbon-14 concentrations furnish $^{14}C/^{12}C$ isotopic ratios with accuracies between 0.5% and 1.0%. It is anticipated that in the future, accuracies of 0.2% or better will become necessary, and to achieve this level of precision careful corrections to compensate for fractionation in the measured data will be needed.

Isotopic fractionation arises from several sources: (1) it may be introduced during formation of the original sample; (2) it may also be introduced during the measurement phase itself from the chemistry used during target preparation, and from differing isotope transmission efficiencies within the ion source and the accelerator. Fractionation corrections to measured $^{14}C/^{12}C$ ratios can be made using the companion isotopic ratio, $^{13}C/^{12}C$. Uncertainties in these ratios can be minimized if the necessary intensity measurements on all three isotopes are made simultaneously rather than sequentially. Simultaneous measurement guarantees that the trajectories of all isotopes are identical, thus avoiding errors which arise from differential accelerator loading from isotope to isotope.

FIG. 1 shows a possible AMS arrangement for simultaneous ratio measurements. A key element is a mass analyzer, which follows the ion source, where all unwanted masses, such as $^{14}NH^-$, are removed. One possible arrangement for this analyzer consists of a combination of four 45° magnets arranged in the form of a Brown Achromat (described by K. L. Brown at IEEE Trans. Nucl. Sci. NS-26(1979)3490) each having normal entry and exit shim angles. Out-of-plane focusing is provided by two electric slot lenses, midway between each of the magnet pairs. At the intermediate mass-dispersion plane, individual carbon isotopes are spatially separated allowing beams of unwanted mass to be eliminated using a simple aperture plate. Because of the symmetry in the above arrangement, the three carbon beams recombine at the entrance to the tandem, producing a composite 12-13-14 beam with an emittance similar to that present at the exit from the ion source. This non-dispersive arrangement of magnets and electrostatic lenses has been given the name 'Recombinator'. Several variations have been described in U.S. Pat. No. 5,013,923 to Litherland and Kilius.

Ions leaving the above recombinator are accelerated to an energy of a few MeV using a tandem accelerator. The ions are then directed by high energy beam transport components into three separate measurement channels; one employs single particle counting for individual $^{14}C$ ions and the other two precision electrical charge measurements for the $^{12}C^{3+}$ and $^{13}C^{3+}$ beams.

Two serious problems arise with a simultaneous acceleration system similar to that described above: Firstly, at the natural abundances of $^{14}C$ present in a modern sample, the post-acceleration mass spectrometer must operate at mass abundance ratios of $10^{-12}$, or below. The ratio of isotopes is sufficiently great that, if care is not taken to avoid scattering and low probability charge changing sequences, $^{12}C$ and $^{13}C$ ions will enter the $^{14}C$ detector channel in such numbers that it becomes overloaded, or is overwhelmed by background events that cannot be distinguished from the wanted $^{14}C$.

A second problem is that modern sputter sources can readily produce more than 100 microamperes of $^{12}C^-$. While these high currents are very desirable to maximize $^{14}C$ yields, acceleration of such large ion currents to MeV energies can introduce substantial numbers of electrons into the acceleration region, because of ionization within the residual gas and because of secondary emission from the surface of the acceleration tube electrodes. Loading currents can cause the longitudinal gradients of the accelerator to become upset, causing focusing instabilities and the production of X-radiations. In addition, acceleration of such high currents to energies of order 10 MeV represents substantial power densities that must be dissipated by beam transport cups and Faraday collectors.

Clearly such instabilities and large power dissipation are undesirable in a precision instrument and because high currents are not essential for adequate normalization, there is considerable advantage in substantially attenuating ion currents of the stable isotopes. For carbon, the natural $^{12}C/^{13}C$ isotopic abundance is close to 100:1; thus, a precision attenuation of ~100 for only $^{12}C$ ions would bring the $^{12}C^{3+}$ and $^{13}C^{3+}$ currents to approximate equality.

SUMMARY OF THE INVENTION

The present apparatus invention is a device which will allow intensities of specific isotopes to be attenuated by a known constant factor.

BRIEF DESCRIPTION OF THE DRAWINGS

The invention may best be understood from the following detailed description thereof, having reference to the accompanying drawings, in which

FIG. 4 is an even more detailed sketch showing the ideal shape of individual attenuation slots.

DESCRIPTION OF THE PREFERRED EMBODIMENT

Figure 1:
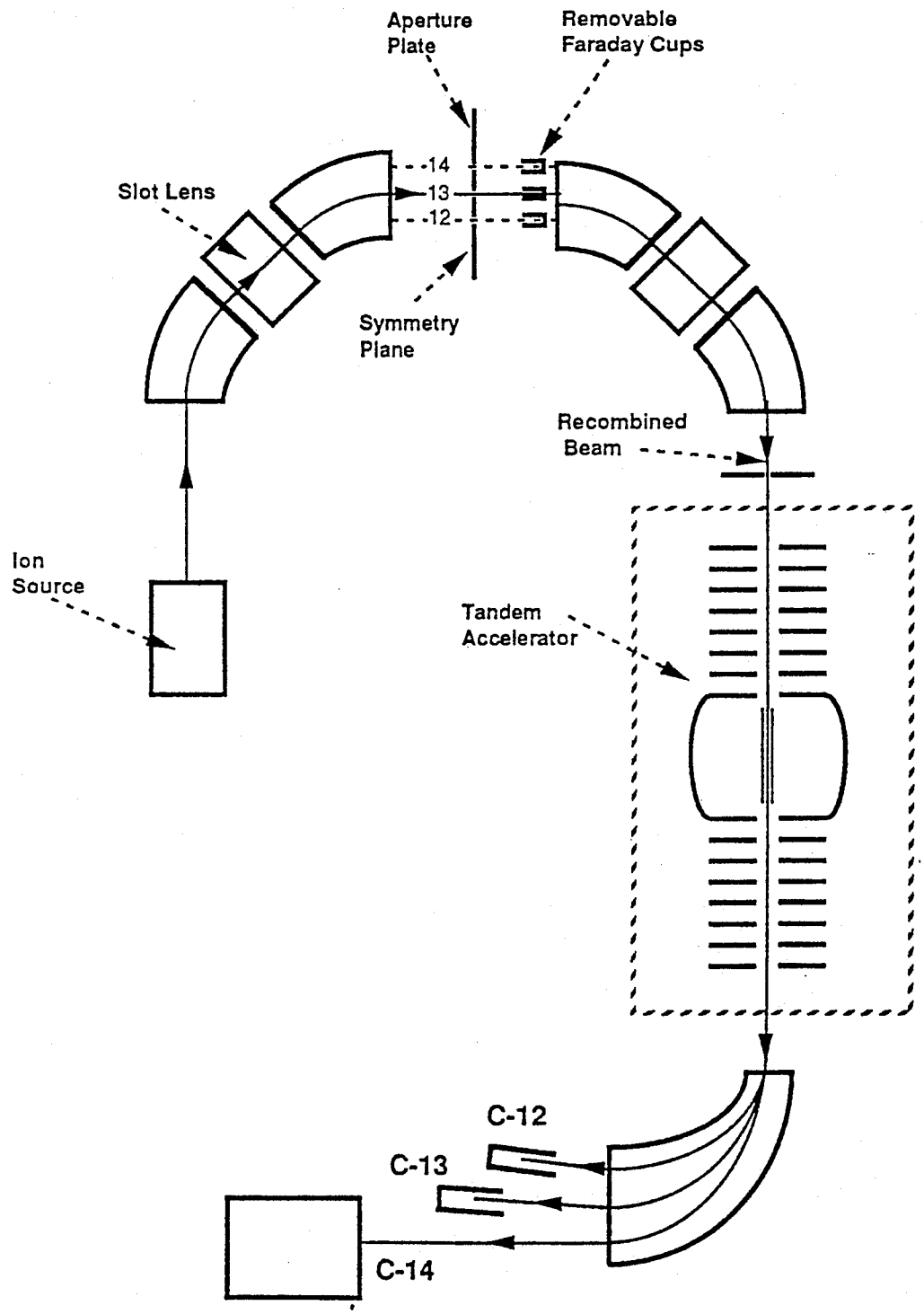
FIG. 1 is a diagram showing a possible AMS arrangement for simultaneous ratio measurements.
Figure 2:
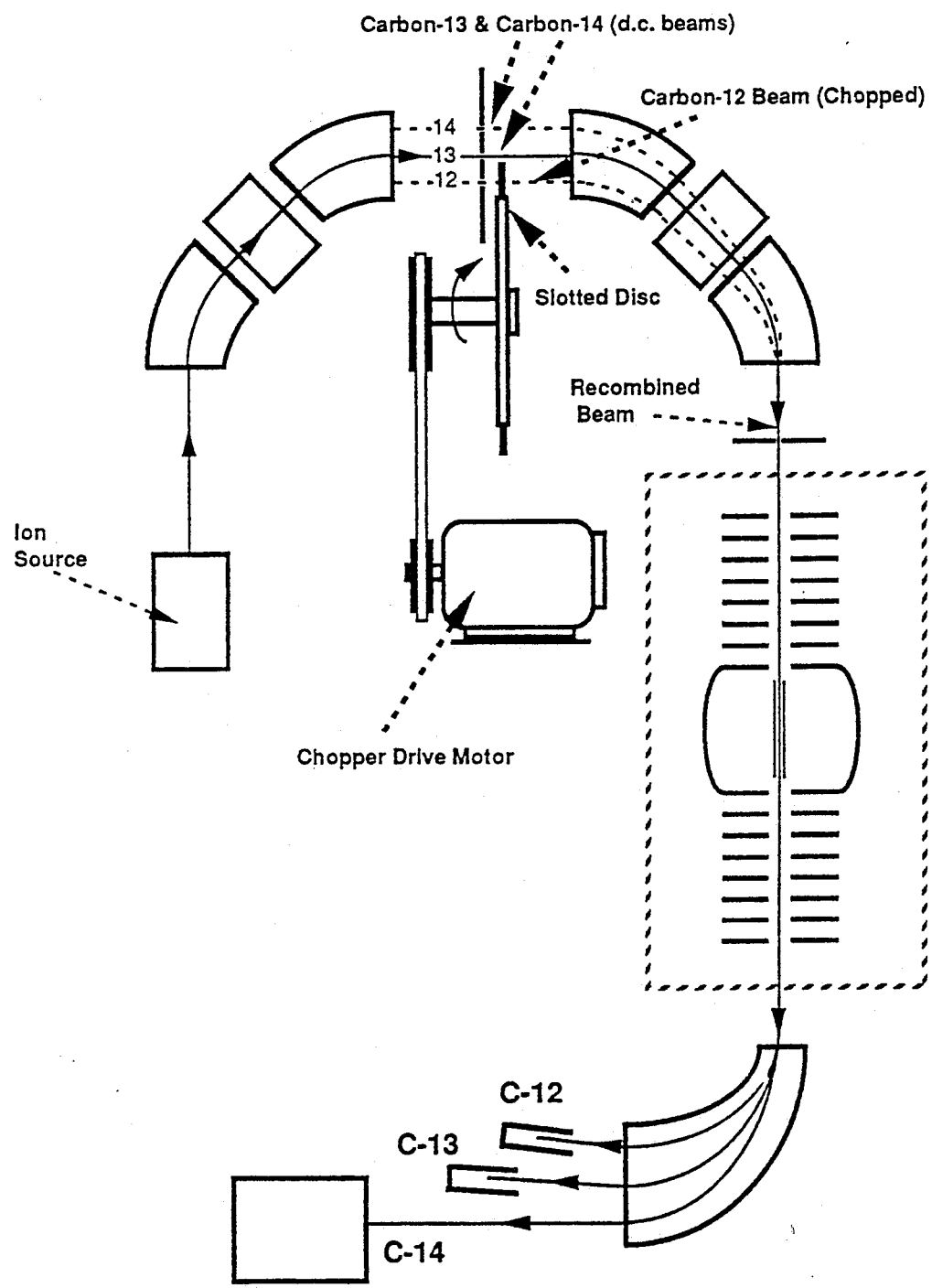
FIG. 2 is a schematic diagram showing the location of the attenuation apparatus in the AMS system shown in FIG. 1.
Figure 3:
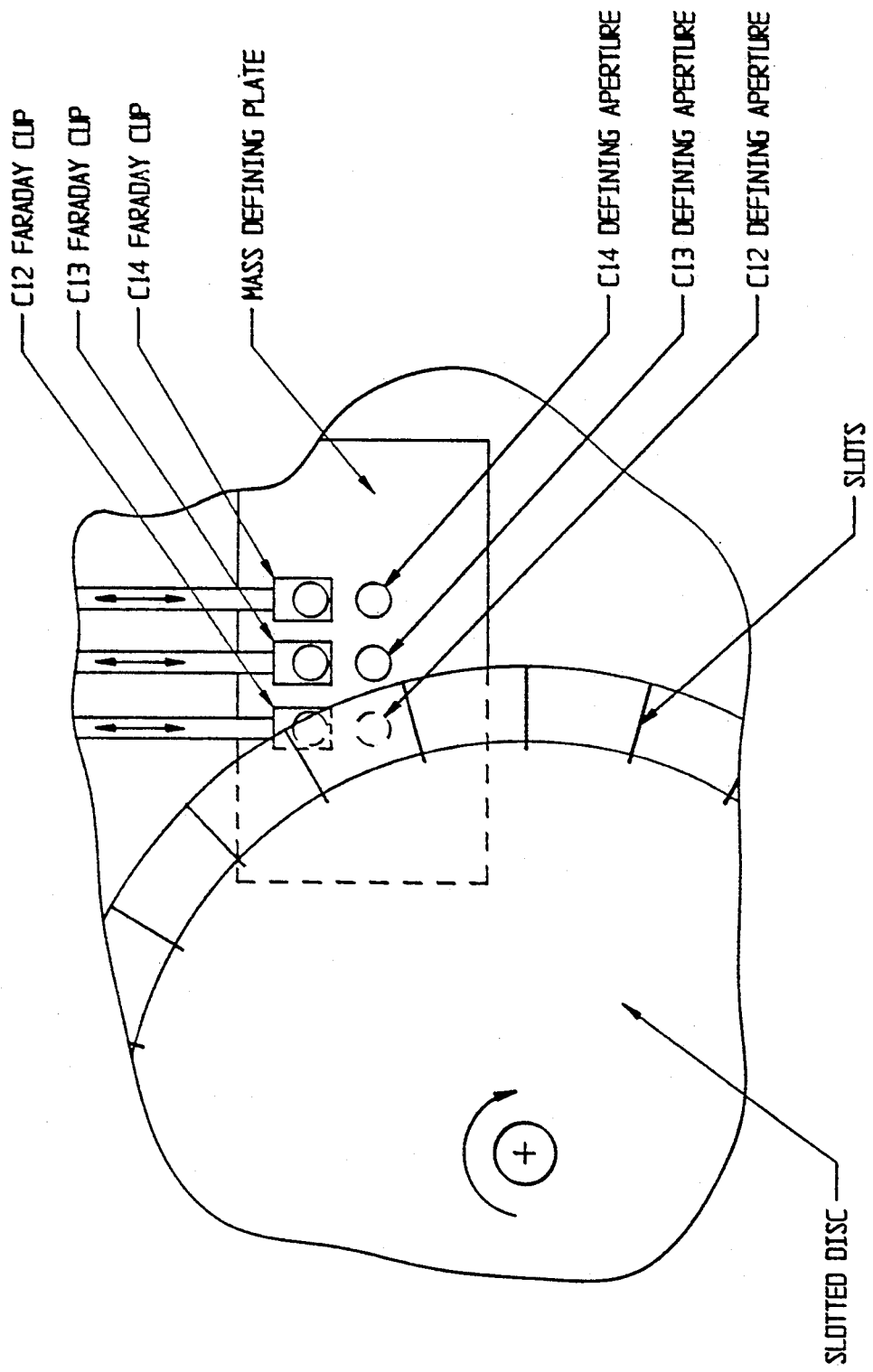
FIG. 3 is a more detailed sketch, at right angles to the beam direction, showing a possible geometry for the attenuation apparatus.

Referring to the drawings, and in particular to FIGS. 2 and 3 thereof, it can be seen that, after passing through the attenuation apertures, the intensities of individual beams can be sampled by separate Faraday cups. A thin rotating wheel, whose periphery is serrated by a series of equispaced slots, is located with its axis parallel to the ion beam so that the slotted periphery region intercepts only the $^{12}C^-$ ions. While the $^{13}C^-$ and the $^{14}C^-$ ions are not affected, the $^{12}C^-$ ions are reduced in intensity by the ratio of the slot width to their circumferential spacing.

Attenuation is only dependent upon the geometry of the disc and not on its speed of rotation. Speed of rotation is only important in as much as the repetition frequency must be sufficiently high that each elementary pulse of charge be sufficiently low that it does not significantly change the terminal voltage. In practice, the disc shown in FIG. 3 can be readily designed to incorporate 24 slots around its periphery and be rotated at a speed of at least 10 revolutions per second leading to a pulsation frequency of 240 pulses/second.

Using a modern source for producing negative carbon ions, it is easy to produce, within an acceptable beam envelope, 100 $\mu A$ of $^{12}C^-$ ions. After attenuation by chopping, the individual current burst introduces an electrical charge of $C^-$ ions equal to $\sim 3.10^{-9}$ coulombs. Thus, assuming that the terminal has a capacitance to ground of 150 pF and that 3+ is the average charge state of the ions after stripping, the instantaneous droop in the accelerator terminal voltage when a pulse enters is ~100 volts. This is comparable to normal terminal voltage fluctuations.

To avoid any changes in the attenuation factor due to radial motions of the centroid of the $^{12}C^-$ ion beam across the disc, the individual slots milled around the periphery should have a sectored shape as shown in FIG. 4. In practice, this sophistication is usually not needed and parallel sided slots are adequate, because the diameter of the disc is large compared to the diameter of the ion beam and the position of the beam centroid is stable.

Having thus described the principles of the invention, together with several illustrative embodiments thereof, it is to be understood that although specific terms are employed, they are used in a generic and descriptive sense, and not for purposes of limitation, the scope of the invention being set forth in the following claims.

I claim:

1. Isotope attenuation apparatus comprising in combination a mass discriminating element which disperses ions across a focal plane according to their mass, an aperture plate located in the focal plane and having a plurality of apertures each of which allows ions of a specific mass to pass through, a second set of mass discriminating elements which accepts all ions passing through the above aperture plate and brings them together in a composite beam, and a rotating disc having parallel sided slots around its periphery, said disc being located near said focal plane with its axis parallel to the trajectory of said ions through said focal plane and positioned so that the slotted region intercepts only the ion beam to be attenuated.

2. The apparatus of claim 1 where the said slots have the form of a truncated wedge structured so that the extensions to the radial sides meet at the center of rotation of the disc.

* * * * *